United States Patent
Yang

(10) Patent No.: US 10,979,996 B2
(45) Date of Patent: Apr. 13, 2021

(54) METHOD FOR PAGING, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/694,187

(22) Filed: Nov. 25, 2019

(65) Prior Publication Data

US 2020/0092843 A1 Mar. 19, 2020

Related U.S. Application Data

(63) Continuation of application No. PCT/CN2018/079638, filed on Mar. 20, 2018.

(51) Int. Cl.
| | |
|---|---|
| *H04W 4/00* | (2018.01) |
| *H04W 68/00* | (2009.01) |
| *H04W 76/28* | (2018.01) |
| *H04L 1/16* | (2006.01) |
| *H04W 56/00* | (2009.01) |

(52) U.S. Cl.
CPC ......... *H04W 68/005* (2013.01); *H04L 1/1642* (2013.01); *H04W 56/001* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 2016/0029434 A1 | 1/2016 | Qiu et al. | |
| 2017/0257845 A1* | 9/2017 | Hu | H04W 72/005 |

(Continued)

FOREIGN PATENT DOCUMENTS

| | | |
|---|---|---|
| CN | 101365185 | 2/2009 |
| CN | 104105199 | 10/2014 |

(Continued)

OTHER PUBLICATIONS

WIPO, ISR for PCT/CN2018/079638, Dec. 19, 2018.

(Continued)

*Primary Examiner* — Phirin Sam
(74) *Attorney, Agent, or Firm* — Hodgson Russ LLP

(57) ABSTRACT

Provided are a method for paging, a network device, and a terminal device. The method for paging comprises: a network device determining a target synchronization signal block (SSB) in a plurality of SSBs of a current bandwidth carrier; and the network device sending a paging message of the terminal device to the terminal device at a frequency domain location where the target SSB is located. In embodiments of the present invention, a target SSB is determined in a plurality of SSBs of a current bandwidth carrier, such that a network device only needs to send a paging message of a terminal device to the terminal device at a frequency domain location where the target SSB is located, effectively reducing load on the network side in the sending of paging messages.

20 Claims, 2 Drawing Sheets

(56) References Cited

U.S. PATENT DOCUMENTS

| | | | | |
|---|---|---|---|---|
| 2018/0288734 A1* | 10/2018 | Islam | .................... | H04W 68/005 |
| 2018/0343676 A1* | 11/2018 | Yerramalli | ........ | H04W 74/0808 |
| 2019/0069271 A1* | 2/2019 | Reial | .................... | H04W 72/005 |
| 2019/0149383 A1* | 5/2019 | Ko | ........................ | H04L 5/0053 370/329 |
| 2019/0223149 A1* | 7/2019 | Tseng | .................... | H04W 16/28 |
| 2019/0223150 A1* | 7/2019 | Islam | .................... | H04W 56/001 |
| 2019/0280836 A1* | 9/2019 | Bhattad | ................ | H04B 7/0695 |
| 2019/0363809 A1* | 11/2019 | Yoon | .................... | H04B 17/318 |
| 2020/0037293 A1* | 1/2020 | Reial | .................... | H04L 5/0023 |
| 2020/0120637 A1* | 4/2020 | Hu | .................... | H04W 72/0446 |
| 2020/0383084 A1* | 12/2020 | Kim | .................... | H04W 68/005 |

FOREIGN PATENT DOCUMENTS

| | | |
|---|---|---|
| CN | 104813722 | 7/2015 |
| CN | 106550452 | 3/2017 |
| CN | 106604321 | 4/2017 |
| CN | 106793059 | 5/2017 |
| CN | 107079404 | 8/2017 |
| CN | 107278383 | 10/2017 |
| WO | 2017196246 | 11/2017 |

OTHER PUBLICATIONS

Zte et al, "Calculation of paging occasion in NR", 3GPP TSG RAN WG2 meeting; #101, R2-1802028, Feb. 26, 2018.

Catt, "Issues on Paging Occasion Design", 3GPP TSG RAN WG2 NR Ad hoc #0118, R2-1800152, Jan. 22, 2018.

MediaTek Inc., "Paging and SS Block Transmission in NR", 3GPP TSG RAN WG2 meeting #101, R2-1801956, Feb. 26, 2018.

3GPP, "Technical Specification Group Radio Access Network; Evolved Universal Terrestrial Radio Access (E-UTRA); User Equipment (UE) procedures in idle mode", 3GPP TS 36.304, vol. 14, issue. 14.5, Dec. 2017.

EPO, EESR for EP 18910802, Jul. 21, 2020.

3GPP, "Technical Specification Group Radio Access Network; NR; NR and NG-RAN Overall Description; Stage 2", 3GPP TS 38.300, vol. 15, Issue 15.1, Mar. 2018.

IPIN, First Office Action for IN Application No. 201917047567, dated Jan. 19, 2021.

CIPO, First Office Action for CA Application No. 3064789, dated Jan. 26, 2021.

SIPO, First Office Action for CN Application No. 201911330063.2, dated Nov. 3, 2020.

SIPO, Notice of Allowance for CN Application No. 201911330063.2, dated Dec. 29, 2020.

* cited by examiner

METHOD FOR PAGING, NETWORK DEVICE, AND TERMINAL DEVICE

CROSS-REFERENCE TO RELATED APPLICATION

This application is a continuation of International Application No. PCT/CN2018/079638, filed on Mar. 20, 2018, the entire disclosure of which is incorporated herein by reference.

TECHNICAL FIELD

The embodiments of the present disclosure relate to the field of communications, and more particularly, to a method for paging, a network device, and a terminal device.

BACKGROUND

With the pursuit of people on speed, delay, high-speed mobility, energy efficiency and the diversity and complexity of services in the future, the international standard organization for 3rd Generation Partnership Project (3GPP) starts to research and develop the 5-Generation Mobile Networks (5G). The main application scenarios of 5G include: Enhance Mobile Broadband (eMBB), Ultra-Reliable and Low Latency Communication (URLLC), and massive Machine Type of Communication (mMTC).

In the early deployment of a 5G New Radio (NR), User Equipment (UE) of the 5G NR is similar to the UE of Long Term Evolution (LTE), which may register with a core network for attachment firstly, then there is context information of the UE in the core network, one of which is tracking area information (TA list). When there is a paging for the UE, the core network issues a paging message at all base stations where the TA list is located, and triggers these base stations to issue the paging for the UE in all cells under the base station. Therefore, a paging range of one UE is to at least issue the paging message in all cells within a range of one TA list.

In the 5G NR, since the cells adopt the form of multiple beams, the paging message needs to be issued under each beam of each cell in order to page the UE. However, for a high-frequency cell, there are more beams, for example, 64 beams, so the paging in one cell needs to be transmitted for 64 times, which increases the signalling load of the network. Therefore, how to reduce the load of transmitting the paging message on a network side by the UE is an urgent problem to be solved.

SUMMARY

Provided are a method for paging, a network device, and a terminal device, which can reduce the load of transmitting the paging message on the network side.

According to a first aspect, there is provided a method for paging, including:

determining, by a network device, a target synchronization signal block (SSB) from a plurality of SSBs of a current wideband carrier; and transmitting, by the network device, a paging message of a terminal device to the terminal device in a frequency domain location where the target SSB is located.

In the embodiments of the present disclosure, the target SSB is determined from the plurality of SSBs of the current wideband carrier, so that the network device only needs to transmit the paging message of the terminal device to the terminal device in a frequency domain location where the target SSB is located, thus being capable of effectively reducing the load of transmitting the paging message on the network side.

In some possible implementations, the determining, by the network device, the target synchronization signal block (SSB) from the plurality of SSBs of the current wideband carrier includes:

determining, by the network device, an index of the target SSB according to a following formula:

$$I = UE\text{-}ID \bmod M;$$

wherein, the mod represents a modulo operation, the I is the index of the target SSB, the UE-ID represents an identification of the terminal device or an operation result taking the identification of the terminal device as an input, and the M is a number of the plurality of SSBs.

In some possible implementations, the UE-ID is a temporary mobile subscriber identity (S-TMSI) of the terminal device, or, the UE-ID is an international mobile subscriber identity (IMSI) of the terminal device.

In some possible implementations, before the determining, by the network device, the target synchronization signal block (SSB) from the plurality of SSBs of the current wideband carrier, the method further includes:

broadcasting, by the network device, at least one of following information to the terminal device:

the M, an index of each SSB in the wideband carrier, and a frequency domain location of each SSB in the wideband carrier.

In some possible implementations, the frequency domain location is an absolute radio frequency channel number (ARFCN), or, the frequency domain location is an offset location relative to a frequency domain location of a current SSB.

In some possible implementations, the determining, by the network device, the target synchronization signal block (SSB) from the plurality of SSBs of the current wideband carrier includes:

determining, by the network device, a system frame number SFN1; and determining, by the network device, an index of the target SSB according to the SFN1 and a following formula:

$$I = SFN1 \bmod M;$$

wherein, the mod represents a modulo operation, the I is the index of the target SSB, and the M is a number of the plurality of SSBs; and the method further includes:

transmitting the paging message to the terminal device on the SFN1.

In some possible implementations, the determining, by the network device, the system frame number SFN1 includes:

determining, by the network device, a system frame number SFN2 according to a following formula:

$$SFN2 \bmod T = (T \operatorname{div} N) * (UE\text{-}ID \bmod N);$$

wherein, the div represents an exact division, the mod represents a modulo operation, the T is a discontinuous reception (DRX) cycle currently used by the terminal device, the UE-ID represents an identification of the terminal device or an operation result taking the identification of the terminal device as an input, and the N is a configuration parameter on a network side or an operation result taking a parameter configured on the network side as an input; and determining, by the network device, the SFN1 on the basis of the SFN2.

In some possible implementations, the determining, by the network device, the SFN1 on the basis of the SFN2 includes:

determining, by the network device, the SFN2 as the SFN1.

In some possible implementations, the determining, by the network device, the SFN1 on the basis of the SFN2 includes:

determining, by the network device, a SFN3 where the nearest SSB is located before the SFN2, and determining a SFN which offsets backward by at least one SFN with respect to the SFN3 as the SFN1.

In some possible implementations, a number of the at least one SFN is set by a system, or the number of the at least one SFN is broadcasted to the terminal device through a system of the network device.

According to a second aspect, there is provided a method for paging, including:

determining, by a terminal device, a target synchronization signal block (SSB) from a plurality of SSBs of a current wideband carrier; and receiving, by the terminal device, a paging message of the terminal device transmitted by a network device in a frequency domain location where the target SSB is located.

In some possible implementations, the determining, by the terminal device, the target synchronization signal block (SSB) from the plurality of SSBs of the current wideband carrier includes:

determining, by the terminal device, an index of the target SSB according to the following formula:

$$I = UE\text{-}ID \bmod M;$$

wherein, the mod represents a modulo operation, the I is the index of the target SSB, the UE-ID represents an identification of the terminal device or an operation result taking the identification of the terminal device as an input, and the M is a number of the plurality of SSBs.

In some possible implementations, the UE-ID is a temporary mobile subscriber identity (S-TMSI) of the terminal device, or, the UE-ID is an international mobile subscriber identity (IMSI) of the terminal device.

In some possible implementations, before the determining, by the terminal device, the target synchronization signal block (SSB) from the plurality of SSBs of the current wideband carrier, the method further includes:

receiving, by the terminal device, at least one of following information broadcasted by the network device:

the M, an index of each SSB in the wideband carrier, and a frequency domain location of each SSB in the wideband carrier.

In some possible implementations, the frequency domain location is an absolute radio frequency channel number (ARFCN), or, the frequency domain location is an offset location relative to a frequency domain location of a current SSB.

In some possible implementations, the determining, by the terminal device, the target synchronization signal block (SSB) from the plurality of SSBs of the current wideband carrier includes:

determining, by the terminal device, a system frame number SFN1; and determining, by the terminal device, an index of the target SSB according to the SFN1 and the following formula:

I=SFN1 mod M;

wherein, the mod represents a modulo operation, the I is the index of the target SSB, and the M is a number of the plurality of SSBs; and the method further includes:

receiving, by the terminal device, the paging message transmitted by the network device on the SFN1.

In some possible implementations, the determining, by the terminal device, the system frame number SFN1 includes:

determining, by the terminal device, a system frame number SFN2 according to a following formula:

$$SFN2 \bmod T = (T \operatorname{div} N)*(UE\text{-}ID \bmod N);$$

wherein, the div represents an exact division, the mod represents a modulo operation, the T is a discontinuous reception (DRX) cycle currently used by the terminal device, the UE-ID represents an identification of the terminal device or an operation result taking the identification of the terminal device as an input, and the N is a configuration parameter on a network side or an operation result taking a parameter configured on the network side as an input; and determining, by the terminal device, the SFN1 on the basis of the SFN2.

In some possible implementations, the determining, by the terminal device, the SFN1 on the basis of the SFN2 includes:

determining, by the terminal device, the SFN2 as the SFN1.

In some possible implementations, the determining, by the terminal device, the SFN1 on the basis of the SFN2 includes:

determining, by the terminal device, a SFN3 where the nearest SSB is located before the SFN2, and determining a SFN which offsets backward by at least one SFN with respect to the SFN3 as the SFN1.

In some possible implementations, a number of the at least one SFN is set by a system, or the number of the at least one SFN is broadcasted to the terminal device through a system of the network device.

According to a third aspect, there is provided a network device, including:

a determination unit configured to determine a target synchronization signal block (SSB) from a plurality of SSBs of a current wideband carrier; and a transceiver unit configured to transmit a paging message of a terminal device to the terminal device in a frequency domain location where the target SSB is located.

According to a fourth aspect, there is provided a terminal device, including:

a determination unit configured to determine a target synchronization signal block (SSB) from a plurality of SSBs of a current wideband carrier; and a transceiver unit configured to receive a paging message of the terminal device transmitted by a network device in a frequency domain location where the target SSB is located.

According to a fifth aspect, there is provided a network device, including:

a processor configured to determine a target synchronization signal block (SSB) from a plurality of SSBs of a current wideband carrier; and a transceiver configured to transmit a paging message of a terminal device to the terminal device in a frequency domain location where the target SSB is located.

According to a sixth aspect, there is provided a terminal device, including:

a processor configured to determine a target synchronization signal block (SSB) from a plurality of SSBs of a current wideband carrier; and a transceiver configured to receive a paging message of the terminal device transmitted by a network device in a frequency domain location where the target SSB is located.

According to a seventh aspect, there is provided a computer readable storage medium configured to store a computer program which includes instructions used to perform the method embodiments according to the first aspect or the second aspect mentioned above.

According to an eighth aspect, there is provided a computer chip, including: an input interface, an output interface, at least one processor and a memory, wherein the processor is configured to execute codes in the memory, and when the codes are executed, the processor may implement various processes executed by the terminal device in the method for paging according to the first aspect or the second aspect mentioned above.

According to a ninth aspect, there is provided a computer chip, including: an input interface, an output interface, at least one processor and a memory, wherein the processor is configured to execute codes in the memory, and when the codes are executed, the processor may implement various processes executed by the network device in the method for paging according to the first aspect or the second aspect mentioned above.

According to a tenth aspect, there is provided a communication system, including the network device and the terminal device mentioned above.

DETAILED DESCRIPTION

Figure 1:
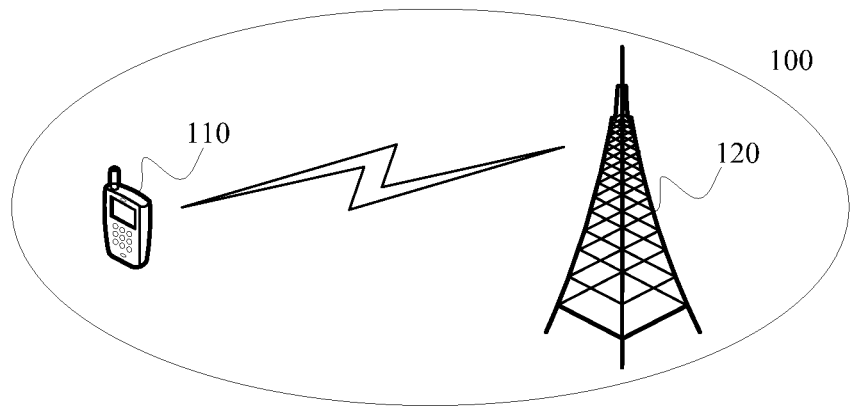
FIG. 1 is an example of an application scenario of the present disclosure.

FIG. 1 is a schematic diagram of an application scenario of an embodiment of the present disclosure.

As shown in FIG. 1, a communication system 100 may include a terminal device 110 and a network device 120. The network device 120 may communicate with the terminal device 110 through an air interface (radio). Multi-service transmission is supported between the terminal device 110 and the network device 120.

It should be understood that the embodiments of the present disclosure are only illustrated by the communication system 100, but the embodiments of the present disclosure are not limited thereto. In other words, the technical solutions of the embodiments of the present disclosure may be applied to various communication systems, for example: a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, a Time Division Duplex (TDD) system, a Universal Mobile Telecommunication System (UMTS), or the like.

Moreover, the present disclosure describes various embodiments in connection with the network device and the terminal device.

The network device 120 may refer to any entity for transmitting or receiving signals at the network side. For example, the network device may be a user equipment of Machine Type Communication (MTC), a Base Transceiver Station (BTS) in GSM or CDMA, a base station (NodeB) in WCDMA, an Evolutional Node B (eNB or eNodeB) in LTE, a base station equipment in a 5G network, etc.

The terminal device 110 may be any terminal device. Specifically, the terminal device 110 may communicate with one or more Core Networks via a Radio Access Network (RAN), and may also be referred to as an access terminal, a User Equipment (UE), a user unit, a user station, a mobile station, a mobile platform, a remote station, a remote terminal, a mobile device, a user terminal, a terminal, a wireless communication device, a user agent, or a user device. For instance, the terminal device may be a cellular phone, a cordless phone, a Session Initiation Protocol (SIP) phone, a Wireless Local Loop (WLL) station, a Personal Digital Assistant (PDA), a handheld device having a wireless communication function, a computing device or other processing device connected to a wireless modem, a vehicle-mounted device, a wearable device, a terminal device in a 5G network, etc.

It can be understood that when the communication system 100 includes a 5G New Radio (NR) communication system, for example, a hybrid deployment scenario is composed of a 5G communication system and a first communication system, etc, the first communication system may be any communication system, for example, a Long Term Evolution (LTE) system, a LTE Time Division Duplex (TDD) system, a Universal Mobile Telecommunication System (UMTS), etc.

User Equipment (UE) of the 5G NR is similar to the UE of Long Term Evolution (LTE), which will register with a core network for attachment firstly, then there is context information of the UE in the core network, one of which is tracking area information (TA list). When there is paging of the UE, the core network issues a paging message at all base stations where the TA list is located, and triggers these base stations to issue paging for the UE in all cells under the base station. Therefore, a paging range of one UE is to at least issue the paging message to all cells within one TA list range.

Figure 2:
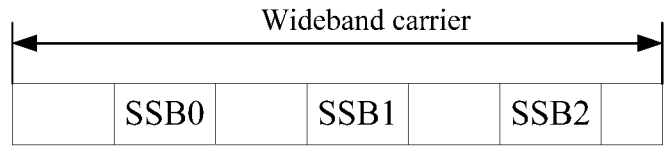
FIG. 2 is a schematic block diagram of a frequency domain resource occupied by a paging message according to an embodiment of the present disclosure.

However, in the 5G NR, since cells are in the form of multiple beams, the paging message needs to be transmitted under each beam of each cell in order to page the UE. However, for a high-frequency cell, there are more beams, for example, 64 beams, thus the paging in one cell is transmitted for 64 times, which increases the signalling load of the network. Further, in order to solve the above problem, in NR discussion version R15, a wideband carrier is a very wide system bandwidth. The maximum channel bandwidth of each NR carrier is 100 MHz for low frequency and 400 MHz for high frequency, and the channel bandwidth of 100 Mhz/400 Mhz is continuous. If the UE remains operating on the wideband carrier, the power consumption of the UE is large. Therefore, it is suggested that a Radio Frequency (RF) bandwidth of the UE may be adjusted according to the actual throughput of the UE. At the same time, in view of the cost of the UE, the maximum radio frequency bandwidth actually supported by the UE may be smaller than a bandwidth supported by the system, i.e., smaller than the wideband carrier. Therefore, a plurality of Synchronization Signal Blocks (SSB) may be transmitted on the entire wideband carrier to meet the access requirements of different UEs. For example, as shown in FIG. 2, the current wideband carrier includes SSB1, SSB2, and SSB2. When there is a paging for the UE, the network device may only issue the paging message of the terminal device on the frequency domain resources where SSB1, SSB2, and SSB2 are located, thus reducing the signalling load of the network.

It may be found that in the technical solution shown in FIG. 2, the network side does not know which SSB the UE resides on because different UEs may choose different SSBs to reside on. Therefore, when the network side transmits a paging message to the UE, the network side may transmit the paging message of the UE on all the SSBs, that is, the foregoing technical solution still has extra load.

In order to solve the extra load existing in the foregoing technical solution, the embodiments of the present disclosure provide a method for paging. By determining a target SSB from a plurality of SSBs of the current wideband carrier, a network device is enabled to only transmit a paging message of a terminal device to the terminal device in a frequency domain location where the target SSB is located, thus further reducing the load of transmitting the paging message on the network side.

Figure 3:
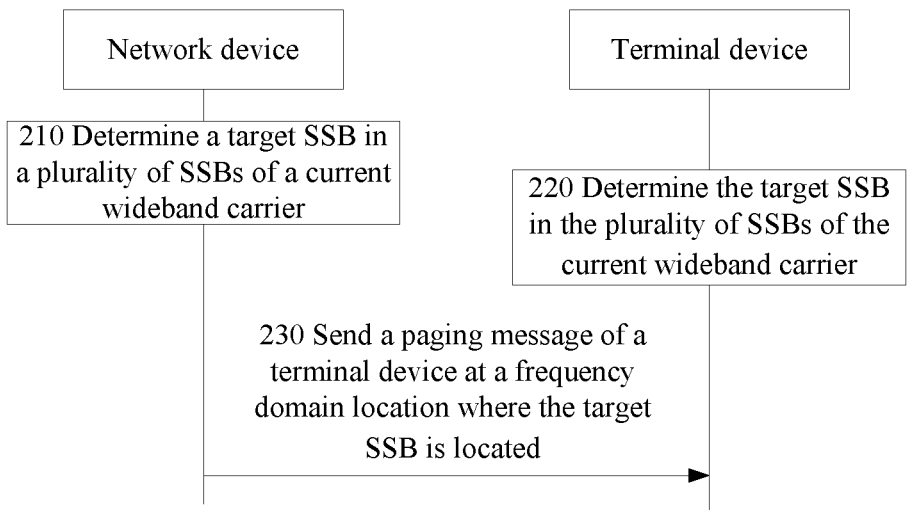
FIG. 3 is a schematic block diagram of a method for paging according to an embodiment of the present disclosure.

FIG. 3 is a schematic flow chart of a method for paging according to an embodiment of the present disclosure.

As shown in FIG. 3, the method includes the following steps.

In 210, a network device determines a target SSB from a plurality of SSBs of a current wideband carrier.

In 220, a terminal device determines a target SSB from a plurality of SSBs of a current wideband carrier.

In 230, the network device transmits a paging message of the terminal device to the terminal device in a frequency domain location where the target SSB is located.

Specifically, for the network device, the network device determines the target Synchronization Signal Block (SSB) from the plurality of SSBs of the current wideband carrier; and then, the network device transmits the paging message of the terminal device to the terminal device in the frequency domain location where the target SSB is located. For the terminal device, the terminal device determines the target Synchronization Signal Blocks (SSB) from the plurality of SSBs of the current wideband carrier; and then, the terminal device receives the paging message of the terminal device transmitted by the network device in the frequency domain location where the target SSB is located.

In one embodiment, the network device may determine an index of the target SSB according to the following formula: I=UE-ID mod M. The mod represents a modulo operation, the I is the index of the target SSB, the UE-ID represents an identification of the terminal device or an operation result taking the identification of the terminal device as an input, and the M is a number of the plurality of SSBs. Further, before the network device determines the target synchronization signal block (SSB) from the plurality of SSBs of the current wideband carrier, the network device may also broadcast at least one of the following information to the terminal device: the M, an index of each SSB in the wideband carrier, and a frequency domain location of each SSB in the wideband carrier. Optionally, the frequency domain location is an Absolute Radio Frequency Channel Number (ARFCN), or, the frequency domain location is an offset location relative to a frequency domain location of a current SSB.

It should be understood that the UE-ID may be any information capable of identifying the terminal device. For example, the UE-ID may be a Temporary Mobile Subscriber Identity (S-TMSI) of the terminal device, and the UE-ID may also be an International Mobile Subscriber Identity (IMSI) of the terminal device. In other alternative embodiments, the UE-ID may also be a Temporary IMSI (TIMSI), a Packet-Temporary Mobile Subscriber Identity (P-TMSI), or an International Mobile Equipment Identity (IMEI) of the terminal device, etc.

In another embodiment, the network device may first determine a system frame number SFN1; and then, the network device may determine an index of the target SSB according to the SFN1 and the following formula: I=SFN1 mod M; wherein, the mod represents a modulo operation, the I is the index of the target SSB, and the M is a number of the plurality of SSBs. Further, the network device may also transmit the paging message to the terminal device on the SFN1.

Specifically, the network device may first determine a system frame number SFN2, and then the network device may determine the SFN1 on the basis of the SFN2. Specifically, the system frame number SFN2 in the above formula may be understood as a Paging Frame (PF) of a Paging Occasion (PO) of a UE, i.e., a System Frame Number (SFN) where the paging occasion starts. In the embodiments of the present disclosure, in order to reduce the power consumption of the UE in an idle state, the UE receives a paging message using a Discontinuous Reception (DRX) manner, and the UE in the idle state monitors a Physical Downlink Control Channel (PDCCH) in specific subframes (1 ms). These specific subframes (1 ms) are called the Paging Occasion (PO), and radio frames (10 ms) where these specific subframes (1 ms) are located are called Paging Frames (PF). Accordingly, the SFN1 may be understood as a System Frame Number (SFN) for determining the index of the target SSB.

In actual operation, after the terminal device calculates the specific positions of the PF and the PO, the UE starts to monitor the PDCCH at the corresponding positions. If a Paging Radio Network Temporary Identifier (P-RNTI) is found, then the paging message is acquired from the Physical Downlink Shared Channel (PDSCH) of the same subframe according to RB allocation and Modulation Coding Scheme (MCS) indicated by the PDCCH. If the paging message contains identification (ID) of the UE, a paging response is initiated; otherwise, the PDCCH at the corresponding position is continuously monitored after a time interval T.

As an example, the network device may determine a system frame number SFN2 according to the following formula:

$$SFN2 \bmod T = (T \text{ div } N)*(UE\text{-}ID \bmod N).$$

The div represents exact division, the mod represents a modulo operation, the T is a discontinuous reception DRX cycle currently used by the terminal device, the UE-ID represents an identification of the terminal device or an operation result taking the identification of the terminal device as an input, and the N is a configuration parameter on a network side or an operation result taking a parameter configured on the network side as an input. For example, N=min(T, nB), wherein T is a DRX cycle and nB is a configuration parameter on the network side.

As an example, the network device may directly determine the SFN2 as the SFN1.

Figure 4:
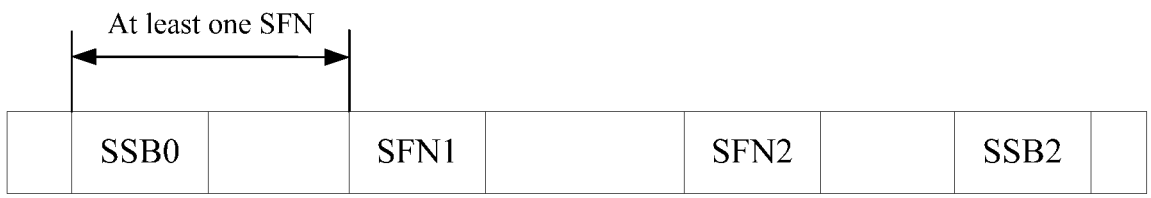
FIG. 4 is a schematic block diagram of a transmission occasion of a paging message according to an embodiment of the present disclosure.

As another example, in order to make the location of the PO closer to the SSB, for example, the SSB is followed by the PO, so that the terminal device may directly receive the paging message after being synchronized by the SSB; therefore, the SFN of the PF calculated by the above formula needs to be migrated to a SFN which is separated by at least one SFN behind the SFN where the nearest SSB is located in front of the PF as a final PF location. The at least one SFN here may be fixed by the system or broadcasted and configured through the system on the network side. In other words, as shown in FIG. 4, the network device may determine the SFN3 where the nearest SSB0 is located in front of the SFN2, and determine a SFN which offsets backward by at least one SFN with respect to the SFN3 as the SFN1. Optionally, the number of the at least one SFN is set by the system, or the number of the at least one SFN is broadcasted to the terminal device through the system of the network device.

It should be appreciated that the determination of the index of the target SSB with the formula I=SFN1 mod M and the transmitting the paging message by the network device to the terminal device on the SFN1 are examples only. For example, in other embodiments, the network device may also determine the index of the target SSB based on the formula I=UE-ID mod M and transmit the paging message to the terminal device on the SFN1.

Figure 5:
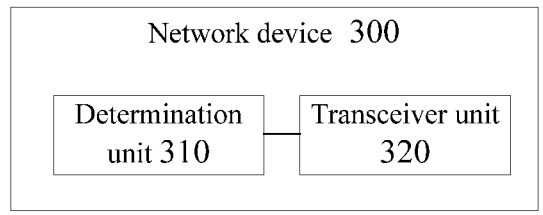
FIG. 5 is a schematic block diagram of a network device according to an embodiment of the present disclosure.

FIG. 5 is a schematic block diagram of a network device according to an embodiment of the present disclosure.

As shown in FIG. 5, the network device 300 may include:

a determination unit 310 configured to determine a target synchronization signal block (SSB) from a plurality of SSBs of a current wideband carrier; and a transceiver unit 320 configured to transmit a paging message of a terminal device to the terminal device in a frequency domain location where the target SSB is located.

Optionally, the determination unit 310 is specifically configured to: determine an index of the target SSB according to the following formula:

$I = UE\text{-}ID \bmod M.$

The mod represents a modulo operation, the I is the index of the target SSB, the UE-ID represents an identification of the terminal device or an operation result taking the identification of the terminal device as an input, and the M is a number of the plurality of SSBs.

Optionally, the UE-ID is a temporary mobile subscriber identity S-TMSI of the terminal device, or, the UE-ID is an international mobile subscriber identity IMSI of the terminal device.

Optionally, before the determination unit 310 determines the target synchronization signal block (SSB) from the plurality of SSBs of the current wideband carrier, the transceiver unit 320 is further configured to broadcast at least one of the following information to the terminal device: the M, an index of each SSB in the wideband carrier, and a frequency domain location of each SSB in the wideband carrier.

Optionally, the frequency domain location is an absolute radio frequency channel number ARFCN, or, the frequency domain location is an offset location relative to a frequency domain location of a current SSB.

Optionally, the determination unit 310 is specifically configured to:

determine a system frame number SFN1; and determine an index of the target SSB according to the SFN1 and the following formula:

$I = SFN1 \bmod M.$

The mod represents a modulo operation, the I is the index of the target SSB, and the M is a number of the plurality of SSBs; and the transceiver unit 320 is specifically configured to:

transmit the paging message to the terminal device on the SFN1.

Optionally, the determination unit 310 is more specifically configured to determine a system frame number SFN2 according to the following formula:

$SFN2 \bmod T = (T \operatorname{div} N) * (UE\text{-}ID \bmod N);$ wherein, the div represents exact division, the mod represents a modulo operation, the T is a discontinuous reception DRX cycle currently used by the terminal device, the UE-ID represents an identification of the terminal device or an operation result taking the identification of the terminal device as an input, and the N is a configuration parameter on a network side or an operation result taking a parameter configured on the network side as an input; and determine the SFN1 on the basis of the SFN2.

Optionally, the determination unit 310 is more specifically configured to determine the SFN2 as the SFN1.

Optionally, the determination unit 310 is more specifically configured to determine a SFN3 where the nearest SSB is located before the SFN2, and determine a SFN which offsets backward by at least one SFN with respect to the SFN3 as the SFN1.

Optionally, the number of the at least one SFN is set by the system, or the number of the at least one SFN is broadcasted to the terminal device through the system of the network device.

Figure 6:
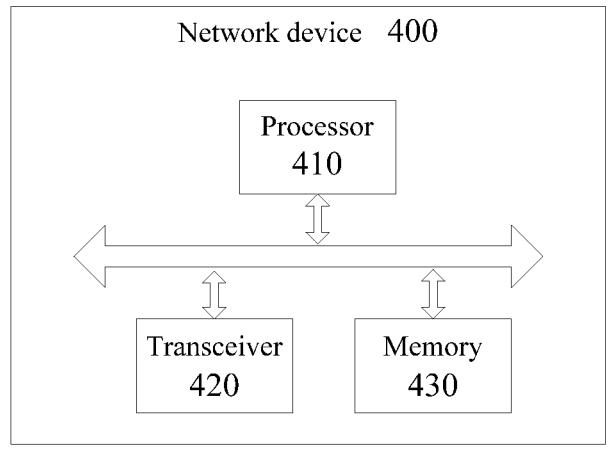
FIG. 6 is a schematic block diagram of another network device according to an embodiment of the present disclosure.

In the embodiments of the present disclosure, the determination unit 310 may be implemented by a processor, and the transceiver unit 320 may be implemented by a transceiver. As shown in FIG. 6, a network device 400 may include a processor 410, a transceiver 420, and a memory 430. The memory 430 may be used to store indication information, and may also be used to store codes, instructions, and the like executed by the processor 410. Various components in the network device 400 are connected together by a bus system, wherein the bus system includes a power bus, a control bus, and a status signal bus in addition to a data bus. The network device 400 as shown in FIG. 6 may implement various processes in the foregoing method embodiments implemented by the network device. In order to avoid repetition, details will not be elaborated herein.

Figure 7:
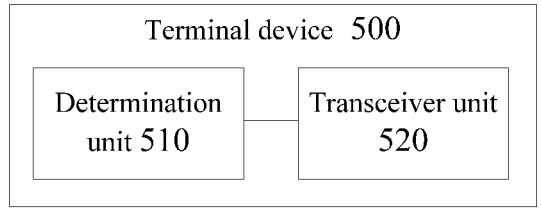
FIG. 7 is a schematic block diagram of a terminal device according to an embodiment of the present disclosure.

FIG. 7 is a schematic block diagram of a terminal device according to an embodiment of the present disclosure.

As shown in FIG. 7, the terminal device includes:

a determination unit 510 configured to determine a target synchronization signal block (SSB) from a plurality of SSBs of a current wideband carrier; and a transceiver unit 520 configured to receive a paging message of the terminal device transmitted by a network device in a frequency domain location where the target SSB is located.

Optionally, the determination unit 510 is specifically configured to determine an index of the target SSB according to the following formula:

$I = UE\text{-}ID \bmod M.$

The mod represents a modulo operation, the I is the index of the target SSB, the UE-ID represents an identification of the terminal device or an operation result taking the identification of the terminal device as an input, and the M is a number of the plurality of SSBs.

Optionally, the UE-ID is a temporary mobile subscriber identity S-TMSI of the terminal device, or, the UE-ID is an international mobile subscriber identity IMSI of the terminal device.

Optionally, before the terminal device determines the target synchronization signal block (SSB) from the plurality of SSBs of the current wideband carrier, the transceiver unit 520 is further configured to receive at least one of the following information broadcasted by the network device: the M, an index of each SSB in the wideband carrier, and a frequency domain location of each SSB in the wideband carrier.

Optionally, the frequency domain location is an absolute radio frequency channel number ARFCN, or, the frequency domain location is an offset location relative to a frequency domain location of a current SSB.

Optionally, the determination unit 510 is specifically configured to determine a system frame number SFN1; and determine an index of the target SSB according to the SFN1 and the following formula:

$I = SFN1 \bmod M.$

The mod represents a modulo operation, the I is the index of the target SSB, and the M is a number of the plurality of SSBs; and the transceiver unit 520 is further configured to:

receive the paging message transmitted by the network device on the SFN1.

Optionally, the determination unit 510 is more specifically configured to determine a system frame number SFN2 according to the following formula:

$SFN2 \bmod T = (T \div N) * (UE\text{-}ID \bmod N);$ wherein, the div represents exact division, the mod represents a modulo operation, the T is a discontinuous reception DRX cycle currently used by the terminal device, the UE-ID represents an identification of the terminal device or an operation result taking the identification of the terminal device as an input, and the N is a configuration parameter on a network side or an operation result taking a parameter configured on the network side as an input; and determine the SFN1 on the basis of the SFN2.

Optionally, the determination unit 510 is more specifically configured to determine the SFN2 as the SFN1.

Optionally, the determination unit 510 is more specifically configured to determine a SFN3 where the nearest SSB is located before the SFN2, and determine a SFN which offsets backward by at least one SFN with respect to the SFN3 as the SFN1.

Figure 8:
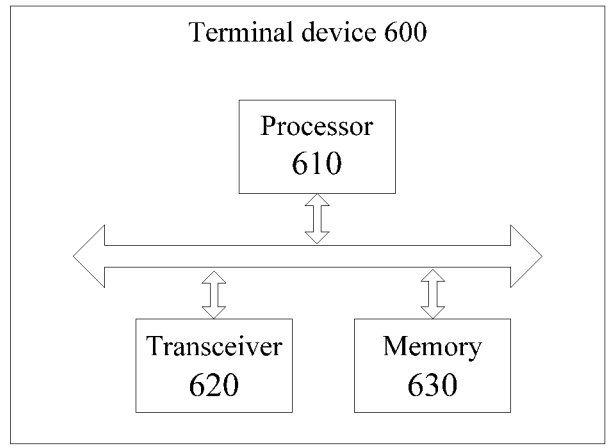
FIG. 8 is a schematic block diagram of another terminal device according to an embodiment of the present disclosure.

It should be noted that in the embodiments of the present disclosure, the determination unit 510 may be implemented by a processor, and the transceiver unit 202 may be implemented by a transceiver. As shown in FIG. 8, the terminal device 600 may include a processor 610, a transceiver 620 and a memory 630. The memory 630 may be used to store indication information, and may also be used to store code, instructions, and the like executed by the processor 610. Various components in the terminal device 600 are connected together by a bus system, wherein the bus system includes a power bus, a control bus, and a status signal bus in addition to a data bus. The terminal device 600 as shown in FIG. 8 may implement various processes in the foregoing method embodiments implemented by the terminal device. In order to avoid repetition, details will not be elaborated herein.

Optionally, the number of the at least one SFN is set by the system, or the number of the at least one SFN is broadcasted to the terminal device through the system of the network device.

In an implementation process, the steps in the foregoing method embodiments in the embodiments of the present disclosure may be completed using an integrated logic circuit of hardware in the processor or an instruction in a form of software. More particularly, steps of the methods disclosed with reference to the embodiments of the present disclosure may be directly executed and accomplished by means of a hardware decoding processor or may be executed and accomplished using a combination of hardware and software modules in the decoding processor. The software module may be located in a mature storage medium in the art, such as a random access memory, a flash memory, a read-only memory, a programmable read-only memory, an electrically erasable programmable memory or a register. The storage medium is located in the memory. The processor reads information from the memory and completes the steps of the foregoing methods in combination with the hardware of the processor.

The processor may be an integrated circuit chip with signal processing capability, and may implement or execute the methods, steps, and logic diagrams disclosed in the embodiments of the present disclosure. For instance, the above processor may be a general purpose processor, a Digital Signal Processor (DSP), an Application Specific Integrated Circuit (ASIC), a Field Programmable Gate Array (FPGA) or other programmable logic device, a discrete gate, a transistor logic device, and a discrete hardware assembly, etc. Moreover, the general purpose processor may be a microprocessor or the processor may be any conventional processor, or the like.

In addition, the memory in the embodiments of the present disclosure may be a volatile memory or a non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM) that acts as an external high speed cache. It should be appreciated that the above-mentioned memories are exemplary but not limiting. For instance, the memory in the embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR RAM), etc. In other words, the memories of the systems and methods described herein are intended to include, but not limited to, these and any other suitable types of memories.

Finally, it should be noted that the terminologies used in the embodiments and the appended claims of the present disclosure are for the purpose of describing specific embodiments only and are not intended to limit the embodiments of the present disclosure.

For instance, as used in the embodiments and the appended claims of the present disclosure, the singular forms "a", "said" and "the" are also intended to include plural forms unless the context clearly indicates other meaning.

Those of ordinary skills in the art may be aware that, in combination with the examples described in the embodiments disclosed herein, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present disclosure.

It may be clearly understood by those skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed systems, apparatuses and methods may be implemented in other ways. For example, the apparatus embodiments described above are merely illustrative. For example, the division of the units is only one logical function division. In practice, there may be other division manners. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, may be located in one place, or may be distributed on multiple network units. Some or all of the units may be selected according to actual needs to achieve the objectives of the embodiments of the present disclosure.

In addition, each functional unit in the embodiments of the present disclosure may be integrated in one processing unit, or each unit may exist alone physically, or two or more units may be integrated in one unit.

The functions may also be stored in a computer-readable storage medium if being implemented in the form of a software functional unit and sold or used as an independent product. Based on such understanding, the essence of the technical solutions according to the embodiments of the present disclosure, or the part contributing to the prior art or all or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present disclosure. The foregoing storage medium includes: any medium that is capable of storing program codes such as a USB flash drive, a removable hard disk, a read-only memory, a random access memory, a magnetic disk, or an optical disk.

The foregoing contents are merely detailed embodiments of the present disclosure, but the protection scope of the embodiments of the present disclosure is not limited thereto. Any person skilled in the art can easily think of changes or substitutions within the technical scope of the embodiments of the present disclosure, and all the changes or substitutions should be covered by the protection scope of the embodiments of the present disclosure. Therefore, the protection scope of the embodiments of the present disclosure should be subjected to the protection scope of the claims.

What is claimed is:

1. A method for paging, comprising:
   determining, by a network device, a system frame number SFN1 according to a system frame number SFN2, the SFN2 satisfies a following formula:

$SFN2 \bmod T = (T \text{ div } N) * (UE\text{-}ID \bmod N)$;

wherein, the div represents an exact division, the mod represents a modulo operation, the T is a discontinuous reception (DRX) cycle currently used by a terminal device, the UE-ID represents an identification of the terminal device or an operation result taking the identification of the terminal device as an input, and the N is a configuration parameter on a network side or an operation result taking a parameter configured on the network side as an input; and transmitting, by the network device, a paging message of the terminal device to the terminal device according to the SFN1;

wherein a difference value between the SFN2 and the SFN1 is an offset of a paging frame.

2. The method according to claim 1, further comprising:
   determining, by the network device, a target synchronization signal block (SSB) corresponding to the SFN1 from a plurality of SSBs of a current wideband carrier; and transmitting, by the network device, the paging message of the terminal device to the terminal device in a frequency domain location where the target SSB is located.

3. The method according to claim 1, wherein at least one SFN is spaced between the SFN2 and the SFN1.

4. The method according to claim 3, wherein the number of the at least one SFN spaced between the SFN2 and the SFN1 is broadcasted to the terminal device through a system of the network device.

5. The method according to claim 1, wherein the offset of the paging frame is broadcasted to the terminal device through a system of the network device.

6. A method for paging, comprising:
   determining, by a terminal device, a system frame number SFN1 according to a system frame number SFN2, the SFN2 satisfies a following formula:

$SFN2 \bmod T = (T \text{ div } N) * (UE\text{-}ID \bmod N)$;

wherein, the div represents an exact division, the mod represents a modulo operation, the T is a discontinuous reception (DRX) cycle currently used by a terminal device, the UE-ID represents an identification of the terminal device or an operation result taking the identification of the terminal device as an input, and the N is a configuration parameter on a network side or an operation result taking a parameter configured on the network side as an input; and receiving, by the terminal device, a paging message of the terminal device transmitted by a network device according to the SFN1;

wherein a difference value between the SFN2 and the SFN1 is an offset of a paging frame.

7. The method according to claim 6, further comprising:
   determining, by the terminal device, a target synchronization signal block (SSB) corresponding to the SFN1 from a plurality of SSBs of a current wideband carrier; and receiving, by the terminal device, the paging message of the terminal device transmitted by the network device in a frequency domain location where the target SSB is located.

8. The method according to claim 6, wherein at least one SFN is spaced between the SFN2 and the SFN1.

9. The method according to claim 8, wherein the number of the at least one SFN spaced between the SFN2 and the SFN1 is broadcasted to the terminal device through a system of the network device.

10. The method according to claim 6, wherein the offset of the paging frame is broadcasted to the terminal device through a system of the network device.

11. A network device, comprising:
a processor configured to determine a system frame number SFN1 according to a system frame number SFN2, the SFN2 satisfies a following formula:

$$SFN2 \bmod T = (T \text{ div } N)*(UE\text{-}ID \bmod N);$$

wherein, the div represents an exact division, the mod represents a modulo operation, the T is a discontinuous reception (DRX) cycle currently used by a terminal device, the UE-ID represents an identification of the terminal device or an operation result taking the identification of the terminal device as an input, and the N is a configuration parameter on a network side or an operation result taking a parameter configured on the network side as an input; and
a transceiver configured to transmit a paging message of the terminal device to the terminal device according to the SFN1;
wherein a difference value between the SFN2 and the SFN1 is an offset of a paging frame.

12. The network device according to claim 11, wherein the processor is further configured to:
determine a target synchronization signal block (SSB) corresponding to the SFN1 from a plurality of SSBs of a current wideband carrier; and
transmit the paging message of the terminal device to the terminal device in a frequency domain location where the target SSB is located.

13. The network device according to claim 11, wherein at least one SFN is spaced between the SFN2 and the SFN1.

14. The network device according to claim 13, wherein the number of the at least one SFN spaced between the SFN2 and the SFN1 is broadcasted to the terminal device through a system of the network device.

15. The network device according to claim 11, wherein the offset of the paging frame is broadcasted to the terminal device through a system of the network device.

16. A terminal device, comprising:
a processor configured to determine a system frame number SFN1 according to a system frame number SFN2, the SFN2 satisfies a following formula:

$$SFN2 \bmod T = (T \text{ div } N)*(UE\text{-}ID \bmod N);$$

wherein, the div represents an exact division, the mod represents a modulo operation, the T is a discontinuous reception (DRX) cycle currently used by a terminal device, the UE-ID represents an identification of the terminal device or an operation result taking the identification of the terminal device as an input, and the N is a configuration parameter on a network side or an operation result taking a parameter configured on the network side as an input; and
a transceiver configured to receive a paging message of the terminal device transmitted by a network device according to the SFN1;
wherein a difference value between the SFN2 and the SFN1 is an offset of a paging frame.

17. The terminal device according to claim 16, the processor is further configured to:
determine a target synchronization signal block (SSB) corresponding to the SFN1 from a plurality of SSBs of a current wideband carrier; and
receive the paging message of the terminal device transmitted by the network device in a frequency domain location where the target SSB is located.

18. The terminal device according to claim 16, wherein at least one SFN is spaced between the SFN2 and the SFN1.

19. The terminal device according to claim 18, wherein the number of the at least one SFN spaced between the SFN2 and the SFN1 is broadcasted to the terminal device through a system of the network device.

20. The terminal device according to claim 16, wherein the offset of the paging frame is broadcasted to the terminal device through a system of the network device.

* * * * *